Patented Dec. 25, 1945

2,391,509

UNITED STATES PATENT OFFICE 2,391,509

MANUFACTURE OF BUTADIENE

Herman Pines and Vladimir N. Ipatieff, Riverside, Ill., assignors to Universal Oil Products Company, Chicago, Ill., a corporation of Delaware No Drawing. Application March 31, 1943, Serial No. 481,265

1 Claim. (Cl. 260—681)

The present invention is concerned with a process for the manufacture of butadiene and enables the production of this compound from the butanes and butenes produced incidental to the cracking of petroleum fractions for the manufacture of gasoline. The process also makes possible the utilization of the normal butane produced incidental to the production of petroleum and that produced in connection with its primary distillation.

Since the present invention consists of a process for the manufacture of butadiene it is related to the problem of producing synthetic rubber from relatively cheap and readily available organic materials. The production of rubber substitutes by polymerizing butadiene or by copolymerizing it with other unsaturated compounds such as styrene and acrylonitrile is established and the present process, therefore, makes possible the production of a base material for use in these synthetic rubber processes.

In a broad aspect the present invention comprises a process for the manufacture of butadiene which consists in converting a butanediol to a butanediol di-alkanoate and then decomposing the resulting di-alkanoate into butadiene and an alkanoic acid by contacting it with a magnesium silicate catalyst.

In a specific embodiment the present invention comprises a process for the manufacture of butadiene which consists in converting a butanediol to a butanediol diacetate and then decomposing the resulting diacetate into butadiene and acetic acid by contacting it with a magnesium silicate catalyst.

Butanediols for conversion to butadiene by the present process can be prepared by treatment of butene-2 with hypochlorous acid to produce the corresponding chlorohydrin, subjecting the chlorohydrin to the action of potassium hydroxide to obtain the alkene oxide and hydrating the latter with a dilute solution of a strong acid such as sulfuric acid or perchloric acid. The diols are readily converted to di-alkanoates by reacting them with acids or acid anhydrides such as acetic and/or acetic anhydride, these reactions occurring readily even in the absence of catalysts.

In regard to the source of butene-2 this compound may be produced from normal butane by thermal decomposition or by dehydrogenation using certain types of catalysts. One type of catalyst useful in such dehydrogenation reactions consists of alumina or other relatively inert refractory carrying material composited with compounds and preferably oxides of elements from the left-hand columns of groups IV, V and VI of the periodic table. The temperatures used in such catalytic dehydrogenations range from about 900° to about 1200° F. in continuous operation while pressures only moderately above atmospheric are used, these pressures seldom being in excess of 100 pounds per square inch.

In accordance with the present invention a butanediol diacetate is decomposed to form butadiene and acetic acid by subjecting it at temperatures within the range of from about 200° to about 550° C. to contact with a magnesium silicate catalyst. Under these conditions and the catalytic influence of the magnesium silicate, the diacetates decompose to form butadiene and acetic acid according to the following equation:

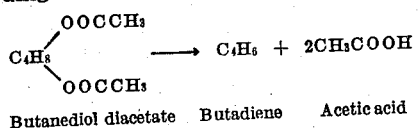

Butanediol diacetate   Butadiene   Acetic acid

In this reaction there is no formation of any substantial amount of acetic anhydride although minor quantities of carbon dioxide and acetone may be formed.

By the use of the preferred catalysts in the present process the decomposition of a butanediol acetate can be brought about at considerably reduced temperatures than those necessary when catalysts are not employed. At the lower temperatures and in the presence of the preferred catalysts the desired butadiene is produced in higher yield and with greater selectivity.

Catalysts which are preferred for the manufacture of butadiene in accordance with the present invention are synthetic magnesium silicates which are made by wet methods of precipitation. These materials are obtainable in extremely fine states of subdivision and have been found to be highly absorbent and active in promoting the present type of reactions. One material which is readily applicable is obtainable under the trade name of "Magnesol." The particles of this material are of an amorphous structure and contain particles as small as 1 micron though the range of particle size is principally from 20 microns to those passing through a standard 325-mesh sieve.

In using the present types of catalysts they may be pelleted into small cylinders of approximately equal diameter and length varying from about ⅛ inch to ¼ inch, and these particles may be placed in stationary beds through which a butanediol diacetate or other di-alkanoate is passed at rates corresponding to the formation of maximum yields of butadiene. After such an operation the acetic acid can be reused for the further production of butanediol diacetate.

The catalyst may also be used in powdered form in the so-called fluid type of catalytic operation in which the catalyst powder is charged to a reactor and the vapors of the reactants passed upwardly therethrough. In one type of operation falling in this category, the catalyst powder carried from the reactor by the stream of reactants may be separated by sedimentation in cyclones or centrifugal devices and returned to the reaction zone in suspension in the entering stream of reactants. In another type of operation commonly designated as the "fluidized fixed bed" operation, the reactants merely maintain circulation or turbulence in the catalyst in the reaction zone without carrying any substantial portion of the catalyst powder outside the zone.

The preceding general description of the process and the reactions involved therein has been given in connection with a diacetate formed by interacting a butanediol with acetic anhydride. However, in place of acetic anhydride, corresponding anhydrides of other monobasic carboxylic acids can be used alternatively. The conditions employed in connection with these other acids both in the manufacture of the butanediol acid addition products and in the decomposition of these products in contact with the preferred catalyst will vary with each acid used. The use of acetic anhydride is generally preferable on account of its greater availability and lower cost.

The present process may be successfully carried out at temperatures varying from about 200° to about 550° C. and atmospheric or mildly superatmospheric pressures. The preferred method of operation is to pass a diacetate over a bed of granular catalyst at a rate determined by the activity of the catalyst.

While butadiene may be readily manufactured in accordance with the present process by decomposing a butanediol diacetate in the presence of the preferred catalysts, decomposition of compounds with other mono-carboxylic acids may also be practiced in the presence of the same catalyst with varying degrees of effectiveness. Thus, a butanediol dipropionate or a butanediol dibutyrate may be employed as well as similar compounds of higher molecular weight acids of this series.

The following example is given of the production of butadiene in accordance with the present process using specific catalysts, but it is not intended to have the effect of correspondingly circumscribing the scope of the invention.

2,3-butylene glycol diacetate was passed over pelleted "Magnesol" at varying temperatures in a number of runs. The significant data obtained are given in the following table:

| Catalyst | "Magnesol" | | | | |
|---|---|---|---|---|---|
| Temperature °C | 300 | 350 | 350 | 400 | 400 |
| Hourly liquid space velocity | 2 | 0.98 | 2 | 1.04 | 3.93 |
| Esters reacted percent | 56.0 | 93.8 | 78.5 | 96.8 | 74.3 |
| Butadiene obtained: | | | | | |
| Percent yield on esters charged | 24.8 | 51.9 | 44.3 | 60.6 | 46.8 |
| Percent yield on esters reacted | 44.5 | 55.2 | 56.4 | 62.6 | 62.9 |
| Condensable gas, mol per cent: | | | | | |
| Butadiene | ---- | 74.3 | 86.3 | 93.7 | 90.2 |
| Butenes | ---- | 10.9 | 9.7 | ---- | ---- |
| Carbon dioxide | ---- | 13.2 | 4.0 | ---- | ---- |

The data in the table show that the best yields of butadiene were obtained at 400° C. and an hourly liquid space velocity of about 1. These conditions gave a 96.8 percent decomposition of the butanediol diacetates with a 60.6 percent yield of butadiene based on the esters charged and a 62.6 percent yield based on the esters reacted. The condensable gas consisted of 93.7 mol percent butadiene. At 350° C. and the same space velocity, the percentage of esters reacted was only slightly lower than the percent reacted at 400° C. but the over-all yield based on the esters charged and the percent yield based on the esters reacted, which is a measure of the efficiency of the reaction, were considerably lower.

We claim as our invention:

A process for producing butadiene which comprises subjecting 2,3-butylene glycol diacetate at a temperature of from about 200° C. to about 550° C. to the action of a magnesium silicate catalyst.

HERMAN PINES.
VLADIMIR N. IPATIEFF.